US010054135B2

(12) United States Patent
Liu et al.

(10) Patent No.: US 10,054,135 B2
(45) Date of Patent: Aug. 21, 2018

(54) DRAINAGE SYSTEM WITH FILTER CONNECTION

(71) Applicant: SUZHOU CLEVA ELECTRIC APPLIANCE CO., LTD., Suzhou, Jiangsu Province (CN)

(72) Inventors: Haiping Liu, Jiangsu (CN); Feifei Yang, Jiangsu (CN)

(73) Assignee: Suzhou Cleva Electric Appliance Co., Ltd., Jiangsu Province (CN)

( * ) Notice: Subject to any disclaimer, the term of this patent is extended or adjusted under 35 U.S.C. 154(b) by 234 days.

(21) Appl. No.: 14/769,156

(22) PCT Filed: Jan. 20, 2014

(86) PCT No.: PCT/CN2014/070908
§ 371 (c)(1),
(2) Date: Aug. 20, 2015

(87) PCT Pub. No.: WO2014/127689
PCT Pub. Date: Aug. 28, 2014

(65) Prior Publication Data
US 2015/0377256 A1    Dec. 31, 2015

(30) Foreign Application Priority Data

Feb. 23, 2013    (CN) .......................... 2013 1 0056879

(51) Int. Cl.
*F04D 29/70*    (2006.01)
*F04D 29/40*    (2006.01)
(Continued)

(52) U.S. Cl.
CPC .......... *F04D 29/708* (2013.01); *B01D 35/02* (2013.01); *B01D 35/14* (2013.01);
(Continued)

(58) Field of Classification Search
CPC ................... F04D 29/406; F04D 29/18; F04D 29/70–29/708; F04D 29/4293;
(Continued)

(56) References Cited

U.S. PATENT DOCUMENTS 1,704,634 A * 3/1929 Snider .................... B01D 35/02
                                                        210/445
2,068,858 A * 1/1937 Jones .................. B01D 46/0012
                                                        210/445
(Continued)

FOREIGN PATENT DOCUMENTS

CN    2306342    2/1999
CN    2554410    6/2003
(Continued)

OTHER PUBLICATIONS

Pages EP-0657602 (machine translation and original attached).*
(Continued)

*Primary Examiner* — David C Mellon
*Assistant Examiner* — Liam Royce
(74) *Attorney, Agent, or Firm* — JK Intellectual Property Law, PA (57) ABSTRACT

A drainage system with filter connection includes a water pump body, a water inlet pipe connected to the water pump body, a water outlet pipe connectable to the water inlet pipe in an orientation forming an annular cavity between an inner surface of the water outlet pipe and an outer surface of the water inlet pipe, a water storage apparatus in communication with the water outlet pipe, a connection fastener for connecting the water inlet pipe and the water outlet pipe to form the annular cavity, and a filter disposed at least partially within the annular cavity. A locating ring is on the periphery of the filter, a cross-section width (W) of the locating ring being greater than a spacing (L) between a front end surface
(Continued)

of the connection fastener and a stop surface on the water storage apparatus.

9 Claims, 6 Drawing Sheets

(51) Int. Cl.
    *F04D 29/18*     (2006.01)
    *B01D 35/14*     (2006.01)
    *B01D 35/02*     (2006.01)
    *F04D 29/60*     (2006.01)
    *F04D 15/02*     (2006.01)
    *F04D 15/00*     (2006.01)
    *F04D 29/42*     (2006.01)

(52) U.S. Cl.
    CPC ..... *F04D 15/0077* (2013.01); *F04D 15/0272* (2013.01); *F04D 29/18* (2013.01); *F04D 29/406* (2013.01); *F04D 29/4293* (2013.01); *F04D 29/605* (2013.01); *B01D 35/023* (2013.01)

(58) Field of Classification Search
    CPC ............. F04D 15/0077; F04D 15/0272; F04D 29/605; B01D 35/02; B01D 35/14; B01D 35/023; B01D 46/0012
    See application file for complete search history.

(56) References Cited

U.S. PATENT DOCUMENTS

| | | | | |
|---|---|---|---|---|
| 2,647,636 | A | * | 8/1953 | Rafferty ............... B01D 35/023 |
| | | | | 210/238 |
| 2004/0031747 | A1 | * | 2/2004 | Dupre .................... B01D 35/02 |
| | | | | 210/411 |
| 2011/0114195 | A1 | * | 5/2011 | Haas ...................... B01D 29/96 |
| | | | | 137/15.01 |

FOREIGN PATENT DOCUMENTS

| | | | |
|---|---|---|---|
| CN | 202013823 | U * | 10/2011 |
| CN | 202326442 | | 7/2012 |
| CN | 203130628 | | 2/2013 |
| EP | 0657602 | | 6/1995 |
| JP | 5-99186 | | 4/1993 |

OTHER PUBLICATIONS

Linhai CN-202013823 (machine translation and original attached).*
English Abstract of CN 203130628.
English Abstract of CN 2306342.
English Abstract of CN 202326442.
English Abstract of CN 2554410.
English Abstract of EP 0657602.
English Abstract of JP 5-99186.
International Search Report dated Apr. 3, 2014 for PCT/CN2014/070908.

* cited by examiner

DRAINAGE SYSTEM WITH FILTER CONNECTION

CROSS-REFERENCE TO RELATED APPLICATIONS

This application claims benefit of Chinese application number 201310056879.7 filed Feb. 23, 2013, and claims priority to PCT International Application No. PCT/CN2014/070908 filed Jan. 20, 2014, both of which are incorporated by reference herein.

TECHNICAL FIELD

The present invention relates to a drainage system, and more particularly, to a drainage system with a water pump filter.

BACKGROUND ART

A present water pump which is quickly mounted and demounted is usually provided with a filter which is convenient to dismount so as to clean debris on the filter and prevent the debris from blocking a water inlet. However, a user will often forget to mount the filter while using the water pump, making the water pump operate without a filter; in this way, the sundries in the sewage and big particles are easily sucked into an impeller cavity of the water pump when the water pump is operating to damage the impeller and reduce the service life of the water pump.

SUMMARY OF THE INVENTION

A technical problem to be solved by the present invention is to provide a drainage system capable of preventing the user from forgetting the filter of the drainage system.

To solve the foregoing technical problem, the present invention provides a drainage system, including: a water pump body, a water pump body water inlet pipe, a water outlet pipe, a water storage apparatus and a connection fastener, wherein: the water inlet pipe and the water outlet pipe are embedded to form an annular cavity, the inside of the annular cavity is provided with a filter, the periphery of the filter is provided with a locating ring, the cross-sectional width (W) of the locating ring is greater than the spacing between the front end surface of the connection fastener and a stop surface, and the connection fastener is provided with a clamping apparatus.

Preferably, the locating ring of the filter is provided with a baffle and a sealing element.

Preferably, the sealing element is an elastic washer and a cross-sectional width thereof is less than the spacing.

Preferably, the filter is in a round table shape with a diameter gradually decreased from an open end to a closed end, and the outer surface of the filter is provided with a reinforcing rib along the axial direction.

Preferably, the locating ring is disposed on the periphery of the open end of the filter.

Preferably, the connection fastener is connected and fastened through a thread structure.

Preferably, the water inlet pipe is provided with a locating ring clamping auxiliary apparatus.

Preferably, the clamping auxiliary apparatus is an annular rib, the clamping apparatus clamps the annular rib, and the annular rib clamps the locating ring.

Preferably, the stop surface is a stop surface that prevents the connection fastener from excessive fastening.

Preferably, the water pump is provided with an anti-toppling switch.

The annular cavity formed between the water inlet pipe and the water outlet pipe is configured to mount the filter. When a user forgets to mount the filter, the annular cavity between the water inlet pipe and the water outlet pipe makes the connection between the water pump and the water storage apparatus unstable, and the position of the water pump will incline; if the user tightens a thread structure to the position of the stop surface at this moment, the clamping auxiliary apparatus and the water outlet pipe cannot be clamped yet when the connection fastener is abutted with the stop surface since the cross-sectional width of the locating ring is greater than the spacing between the front end surface of the connection fastener and the stop surface, prompting the user to mount the filter, whereas an anti-toppling switch in the water pump is off, and the water pump cannot work, thus ensuring the safety of the user and the water pump.

DETAILED DESCRIPTION OF THE PREFERRED EMBODIMENTS

Figure 1:
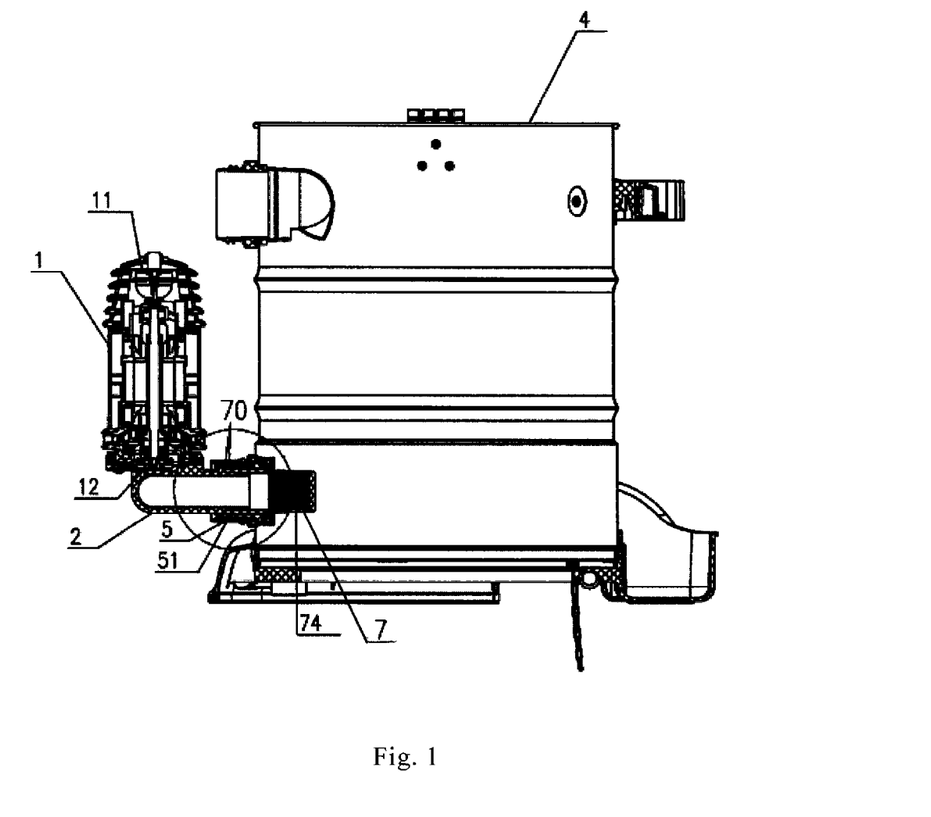
FIG. 1 is a partial cross-sectional view of a drainage system.
Figure 2:
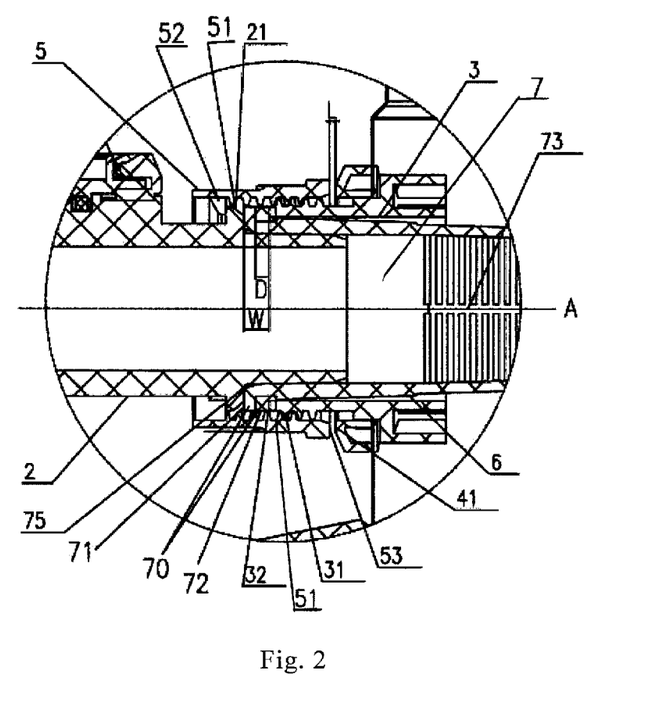
FIG. 2 is a partial enlarged cross-sectional view of a joint of a water pump and a water storage apparatus in FIG. 1.
Figure 3:
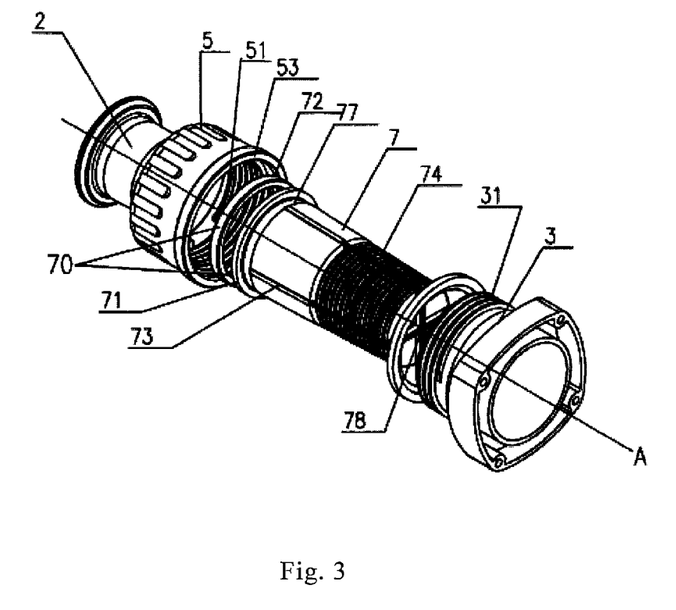
FIG. 3 is an exploded isometric view of the joint of the water pump and the water storage apparatus.

Referring to FIGS. 1, 2 and 3, a drainage system includes: a water pump body 1, a water inlet pipe 2, a thread element 5, a filter 7, an elastic washer 72, a water outlet pipe 3 and a water storage bucket 4. The water pump body 1 is mounted on the water inlet pipe 2, and the periphery of the water inlet pipe 2 is provided with an annular rib 21. The water outlet pipe 3 is disposed on the water storage bucket 4, the periphery of the water outlet pipe 3 is provided with an external thread 31 for being matched with internal threads 51 of the thread element 5, and the thread element 5 when being screwed together with the water outlet pipe 3 can play a role of connecting the water outlet pipe 3 and the water inlet pipe 2. The periphery of the open end 75 of the filter 7 is provided with a locating ring 70, and a filtering grid 74 is disposed between the open end 75 and the closed end 78 of the filter 7.

Referring to FIGS. 1, 2 and 3, the water pump body 1 is provided with an anti-toppling switch 11. The thread element 5 is provided with an internal thread 51 which is mutually engaged with the external thread 31 of the water outlet pipe 3. A fastening ring 52 is disposed at the tail part inside the thread element 5, the fastening ring 52 being located between the annular rib 21 of the water inlet pipe 2 and the water pump body 1. The fastening ring 52 extends inwards and overlaps with the annular rib 21 so that the thread element 5 can rotate flexibly and cannot break away from the water inlet pipe 2.

The outer diameter of the water inlet pipe 2 is less than the inner diameter of the water outlet pipe 3. When the water inlet pipe 2 is located inside the water outlet pipe 3, the other end of the water inlet pipe 2 is connected to an impeller cavity 12, the thread element 5 is connected to the water inlet pipe 2 and the water outlet pipe 3 through being screwed together with the external thread 31 of the water outlet pipe 3. An annular cavity 6 is formed between the water inlet pipe 2 and the water outlet pipe 3, and the filter 7 is mounted inside the annular cavity 6. The water inlet pipe 2 is inserted into the open end 75 of the filter 7. The closed end 78 of the filter 7 is inserted into the water outlet pipe 3. The filter 7 is in a frusto-conical shape, and the diameter of the filter 7 gradually decreases from the open end 75 to the closed end 78. The locating ring 70 of the filter 7 is located between the annular rib 21 of the water inlet pipe 2 and the water outlet 32 of the water outlet pipe 3, and the diameter of the locating ring 70 is greater than the diameter of the water outlet 32. The locating ring 70 includes a baffle 71 and an elastic washer 72 made of an elastic material, and the elastic washer 72 is mounted in a slot 77 adjacent to the baffle 71.

When mounting the water pump, the water inlet pipe 2 is inserted into the open end 75 of the filter 7, the closed end of the filter 7 is inserted into the water outlet pipe 3, the reinforcing rib 73 and the inner surface of the water outlet pipe 3 are jointed to guide the mounting, so that the internal thread 51 of the thread element 5 is easily aligned with the external thread 31 of the water outlet pipe 3. The fastening ring 52 of the thread element 5 is then rotated to drive the annular rib 21 and the baffle 71 to move towards the water storage bucket 4 along the axial direction (A) the annular rib 21 of the water inlet pipe 2 and the water outlet 32 clamping the locating ring 70, and the elastic washer 72 sealing the water outlet 32. The cross-sectional width D of the elastic washer 72 is less than the spacing L between the front end surface 53 of the thread element 5 and a stop surface 41. When the thread element 5 is screwed to the maximum extent, there is still a certain distance between the front end surface 53 of the thread element 5 and the stop surface 41, ensuring that the elastic washer 72 is clamped with an optimal sealing effect before the thread element 5 abuts the stop surface 41. When the water pump is working, a water flow flows through the filter 7 and then through the water outlet pipe 3 to block foreign matters and big particles from entering the inside of the impeller cavity 12 of the water pump body through the water inlet pipe 2 to damage the impeller.

Figure 4:
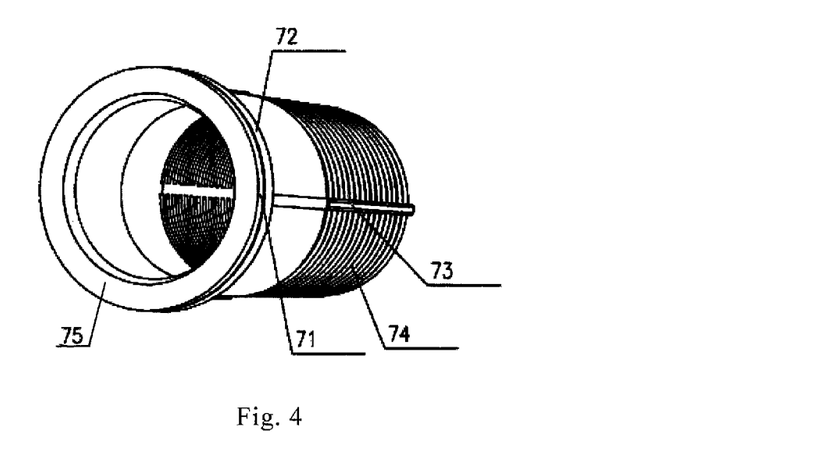
FIG. 4 is a front isometric view of the filter.
Figure 5:
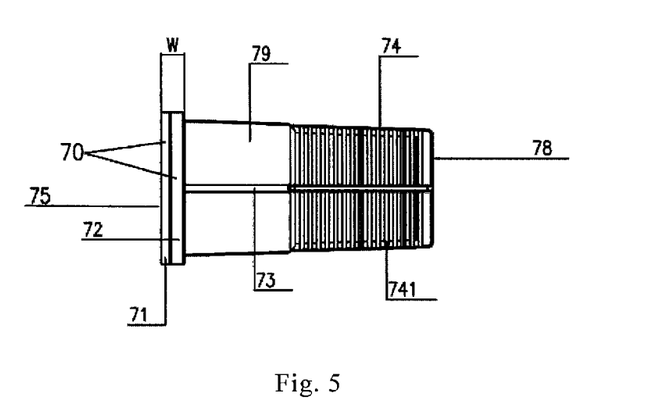
FIG. 5 is a side view of the filter.
Figure 6:
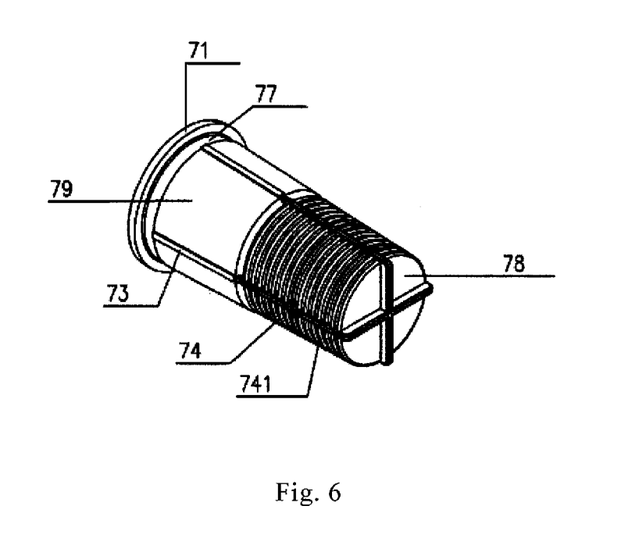
FIG. 6 is a rear isometric view of the filter.

Referring to FIGS. 4, 5 and 6, the filter 7 includes the body and the elastic washer 72, wherein the body is an integrated element which is entirely in a round table shape, the open end 75 of the fitler being located at one end of the round table with a larger diameter, and the closed end 78 of the filter being located at the other end of the round table with a smaller diameter. The open end 75 is provided with the baffle 71 extending outwardly along the radial direction, the outside of the baffle 71 is provided with a slot 77, a filter wall 79 is adjacent to the slot 77, and a filtering grid 74 extends from the filter wall 79 to the closed end 78. The filtering grid 74 consists of radial round rings 741 and a longitudinal reinforcing rib 73. The reinforcing rib 73 is evenly distributed on the surface of the filter wall 79, extends to and is connected to the adjacent round rings 741, and is finally intersected with the closed end 78 at the bottom. The elastic washer 72 is sheathed on the slot 77 and, together with the baffle 71, forms a locating ring 70 of the filter. The cross-sectional width of the locating ring is W, wherein the width W decreases with the compression of the elastic washer during mounting, and the width W is also greater than the spacing L between the front end surface 53 and the stop surface 41 all the time.

Figure 7:
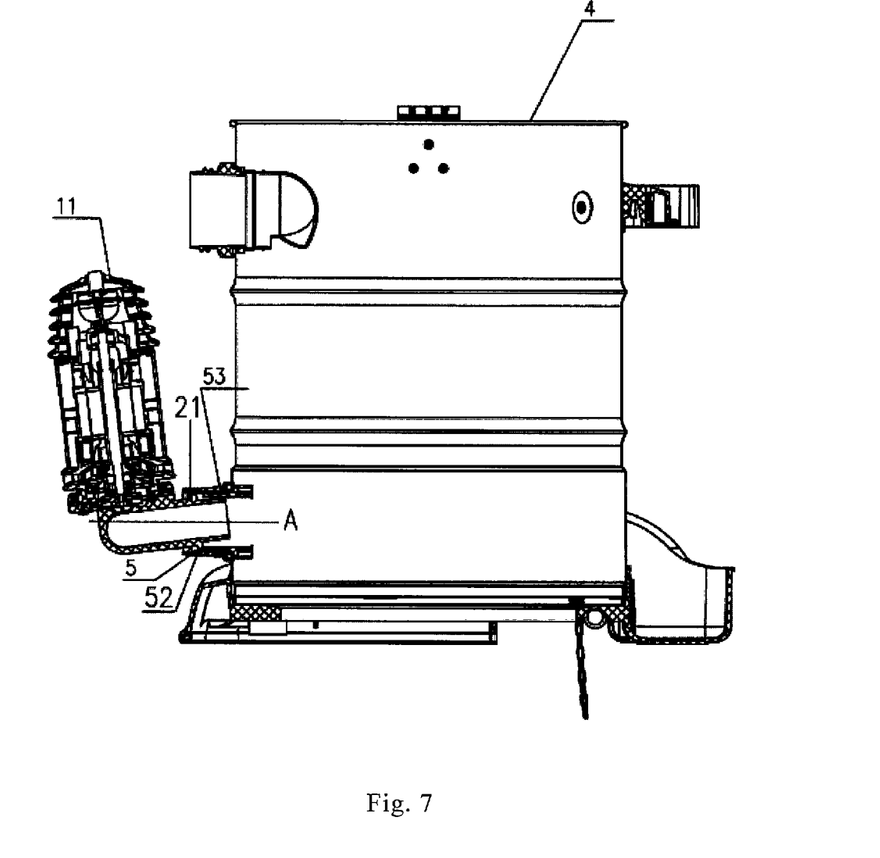
FIG. 7 is a partial cross-sectional view showing the state of the drainage system without mounting a filter.

Referring to FIGS. 2 and 7, when a user does not mount the filter 7 and does not screw on the thread element 5, the front end surface 53 is not abutted with the stop surface 41, the annular cavity 6 between the water inlet pipe 2 and the water outlet pipe 3 loses the filling of the filter 7 so that the connection between the water pump and the water storage bucket 4 is not stable. At this moment, if the thread element 5 is screwed up to make the front end surface 53 abut the stop surface 41, the annular rib 21 will not be abutted with the water outlet 32 and clamped since the width of the locating ring 70 (i.e., the distance from the contact surface of the annular rib 21 and the baffle 71 to the water outlet 32) is greater than the spacing L between the front end surface 53 of the thread element and the stop surface 41. The water pump therefore still has a space for moving along the axial direction, and the connection between the water pump and the water storage bucket 4 is not stable. Based on the foregoing reasons, when the filter 7 is not mounted, the water pump will incline to trigger the anti-toppling switch 11 internally disposed inside the water pump. The anti-toppling switch 11 cuts off the power of the motor to prevent the water pump from being started abnormally, so as to protect the safety of the water pump and the user. When the water pump inclines, the motor cannot work normally, prompting the user to mount the filter 7 again, and meanwhile, triggering the anti-toppling switch 11 to prevent the water pump from being started abnormally.

In conclusion, in case that the user forgets mounting the filter 7, the water pump will incline no matter whether the thread element 5 is rotated to the position abutted with the stop surface 41; moreover, the anti-toppling switch 11 internally disposed in the water pump is triggered when the water pump inclines, thus ensuring the safety of the user and the water pump.

The foregoing implementation manner is one preferred embodiment of the present invention, but the present invention is not limited to this. Modifications and replacement made by those skilled in the art without departing from the scope of the claims of the present invention shall all fall within the scope of the claims of the present invention.

The invention claimed is:
1. A drainage system with filter connection, comprising:
   a water pump body;
   a water inlet pipe connected to the water pump body;
   a water outlet pipe connected to the water inlet pipe in a concentric orientation forming an annular cavity between an inner surface of the water outlet pipe and an outer surface of the water inlet pipe;
   a water storage apparatus in communication with the water outlet pipe;
   a connection fastener connecting the water inlet pipe and the water outlet pipe to form the annular cavity;
   a filter disposed at least partially within the annular cavity; and
   a locating ring on the periphery of the filter, a cross-sectional width (W) of the locating ring in an axial direction (A) of the locating ring being greater than a spacing (L) between a front end surface of the connection fastener and a stop surface on the water storage apparatus.

2. The drainage system with filter connection according to claim 1, wherein the locating ring of the filter includes a baffle and a sealing element.

3. The drainage system with filter connection according to claim 2, wherein the sealing element is an elastic washer having a cross-sectional width (D) less than the spacing (L).

4. The drainage system with filter connection according to claim 1, wherein the filter is in a frusto-conical shape with a diameter gradually decreased from an open end to a closed end, and the outer surface of the filter includes a reinforcing rib along the axial direction.

5. The drainage system with filter connection according to claim 4, wherein the locating ring is disposed on the open end of the filter.

6. The drainage system with filter connection according to claim 1, wherein the connection fastener includes internal threads that mate with external threads on the water outlet pipe.

7. The drainage system with filter connection according to claim 1, wherein the water inlet pipe has an annular rib.

8. The drainage system with filter connection according to claim 7, wherein the locating ring is clamped between the annular rib of the water inlet pipe and a water outlet of the water outlet pipe.

9. The drainage system with filter connection according to claim 1, wherein the water pump includes an anti-toppling switch.

\* \* \* \* \*